US012756190B2

(12) United States Patent
Narayanaswamy et al.

(10) Patent No.: US 12,756,190 B2
(45) Date of Patent: Oct. 6, 2026

(54) SYSTEMS AND METHODS FOR OPTIMIZING SOLAR POWER USING ARRAY TOPOLOGY RECONFIGURATION THROUGH A REGULARIZED DEEP NEURAL NETWORK

(71) Applicants: Vivek Sivaraman Narayanaswamy, Tempe, AZ (US); Rajapandian Ayyanar, Chandler, AZ (US); Cihan Tepedelenlioglu, Chandler, AZ (US); Andreas Spanias, Tempe, AZ (US)

(72) Inventors: Vivek Sivaraman Narayanaswamy, Tempe, AZ (US); Rajapandian Ayyanar, Chandler, AZ (US); Cihan Tepedelenlioglu, Chandler, AZ (US); Andreas Spanias, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 876 days.

(21) Appl. No.: 18/121,388

(22) Filed: Mar. 14, 2023

(65) Prior Publication Data

US 2023/0291203 A1 Sep. 14, 2023

Related U.S. Application Data

(60) Provisional application No. 63/319,514, filed on Mar. 14, 2022.

(51) Int. Cl.

*H02J 3/00* (2026.01)
*G05F 1/67* (2006.01)
*H02J 101/24* (2026.01)

(52) U.S. Cl.

CPC ................ *H02J 3/004* (2020.01); *G05F 1/67* (2013.01); *H02J 2101/25* (2026.01)

(58) Field of Classification Search

CPC ........ H02J 3/004; H02J 2101/25; H02J 3/381; H02J 2101/24; G05F 1/67

See application file for complete search history.

(56) References Cited

U.S. PATENT DOCUMENTS

2019/0384983 A1* 12/2019 Katoch .................. G06V 20/00
2020/0274484 A1* 8/2020 Narayanaswamy ..... G06N 3/09

OTHER PUBLICATIONS

Narayanaswamy, Vivek Sivaraman, et al. "Connection topology optimization in photovoltaic arrays using neural networks." 2019 IEEE International Conference on Industrial Cyber Physical Systems (ICPS). IEEE, 2019. (Year: 2019).*

(Continued)

*Primary Examiner* — Chuen-Meei Gan

(74) *Attorney, Agent, or Firm* — Polsinelli PC

(57) ABSTRACT

A system reconfigures a photovoltaic array used in solar energy based on observed shading conditions to determine an optimal topology of the photovoltaic array to maximize power output. Specifically, the system is designed to reconfigure a photovoltaic array when the photovoltaic array is partially shaded. The system uses a neural network model to determine a topology that maximizes power output of the photovoltaic array based on irradiance data obtained from the photovoltaic array.

24 Claims, 12 Drawing Sheets

(56) References Cited

OTHER PUBLICATIONS

Narayanaswamy, Vivek Sivaraman. "Online modules to introduce students to solar array control using neural nets." ASEE Annual Conference and Exposition, Conference Proceedings. American Society for Engineering Education, 2019. (Year: 2019).*
Vadivel, Srinivasan, et al. "Performance enhancement of a partially shaded photovoltaic array by optimal reconfiguration and current injection schemes." Energies 14.19 (2021): 6332. (Year: 2021).*
Narayanaswamy et al., Connection topology optimization in photovoltaic arrays using neural networks, IEEE ICPS, pp. 167-172, 2019.
Pendem et al., Modeling, simulation and performance analysis of solar pv array configurations (series, series-parallel and honey-comb) to extract maximum power under partial shading conditions, Energy Reports, pp. 274-287, 2018.
Rao et al., Dropout and pruned neural networks for fault classification in photovoltaic arrays, IEEE Access, pp. 120 034-120 042, 2021.
Drif et al., A new estimation method of irradiance on a partially shaded pv generator in grid-connected photovoltaic systems, Renewable energy, vol. 33, pp. 2048-2056, 2008.
Garcia et al., Solar-tracking pv plants in navarra: A 10 mw assessment, Progress in photovoltaics: Research and Applications, vol. 17, pp. 337-346, 2009.
Braun et al., Signal processing for solar array monitoring, fault detection, and optimization, Lectures on Power Electronics, Morgan & Claypool, vol. 7, pp. 1-95, 2012.
Krishna et al., Reconfiguration strategies for reducing partial shading effects in photovoltaic arrays: State of the art, Solar Energy, vol. 182, pp. 429-452, 2019.
Pareek et al., Optimal interconnections to address partial shading losses in solar photovoltaic arrays, Solar Energy, vol. 155, pp. 537-551, 2017.
Liu et al., Reconfiguration method to extract more power from partially shaded photovoltaic arrays with series-parallel topology, Energies, 2019.
Velasco-Quesada et al., Electrical pv array reconfiguration strategy for energy extraction improvement in grid-connected pv systems, IEEE Trans. on Ind. Elect., pp. 4319-4331, 2009.
Nguyen et al., A reconfigurable solar photovoltaic array under shadow conditions, in 2008 23rd Annual IEEE Applied Power Electronics Conference and Exposition. IEEE, 2008, pp. 980-986.
Braun et al., Topology reconfiguration for optimization of photovoltaic array output, Segan, pp. 58-69, 2016.
Pagliari et al., Irradiance-driven partial reconfiguration of pv panels, In Date, pp. 884-889, 2019.
Copper conductor pv (solar) cable datasheet, https://www.prioritywire. com/pages/copper pv solar.php, accessed: Mar. 11, 2021.
Gal et al., Dropout as a bayesian approximation: Representing model uncertainty in deep learning, in ICML. JMLR, 2016, pp. 1050-1059.
Ioffe et al., Batch normalization: Accelerating deep network training by reducing internal covariate shift, in ICML. PMLR, 2015, pp. 448-456.

* cited by examiner

SYSTEMS AND METHODS FOR OPTIMIZING SOLAR POWER USING ARRAY TOPOLOGY RECONFIGURATION THROUGH A REGULARIZED DEEP NEURAL NETWORK

CROSS-REFERENCE TO RELATED APPLICATIONS

This is a U.S. Non-Provisional Patent Application that claims benefit to U.S. Provisional patent application Ser. No. 63/319,514 filed 14 Mar. 2022, which is herein incorporated by reference in its entirety.

GOVERNMENT SUPPORT

This invention was made with government support under 1646542 and 2019068 awarded by the National Science Foundation. The government has certain rights in the invention.

FIELD

The present disclosure generally relates to photovoltaic array operation, and in particular, to a system and associated method for maximizing power output of a photovoltaic array by determining a photovoltaic array topology that maximizes power output based on irradiance of the photovoltaic array.

BACKGROUND

Photovoltaic (PV) energy systems have played a major part in meeting the renewable energy requirements over the past decade. However, power production from PV systems faces impediments such as partial shading due to environmental and man-made obstructions. Shading causes voltage and current mismatch losses that can significantly reduce the power supplied to the grid.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1A:
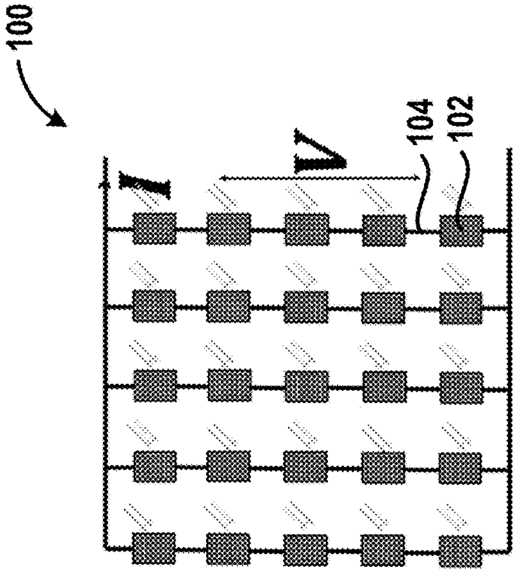
FIGS. 1A-1D are a series of illustrations showing 5×5 photovoltaic topologies respectively corresponding to Series-Parallel (SP), Bridge Link (BL), Honeycomb (HC) and Total-cross-tied (TCT) topologies.

Various embodiments of a system and associated methods for deep neural network-based topology reconfiguration of photovoltaic arrays for output power maximization are disclosed herein.

Reconfiguring photovoltaic (PV) array connections is a powerful strategy to mitigate the impact of shading in energy production. Conventionally, PV arrays rely on fixed connections or topologies to generate power required by the grid. However. under partial shading, alternate topologies such as series-parallel (SP), bridge-link (BL), honeycomb (HC) or total-cross-tied (TCT) can lead to improved power production motivating the need for a systematic approach to perform reconfiguration based on the extent of shading on the panels. Various studies highlight the importance of reconfiguring PV arrays to tackle mismatch losses.

There have been several efforts towards addressing PV topology reconfiguration. One system in particular used irradiance equalization in TCT arrays where panels are reconfigured to receive similar irradiance across every row. Another system utilized auxiliary unshaded panels to mitigate partial shading. Additionally, some have proposed strategies to select the best topology among SP, BL and TCT by comparing the maximum powers generated using a simulator driven, sequential approach for different shading conditions. However, such approaches are not scalable with the size of the array and can incur significant overheads. More recently, with the advent of machine learning (ML), one work proposed a graph clustering-based reconfiguration strategy to combine different panels and reported performance improvements.

In contrast, the system disclosed herein provides novel results using regularized neural networks with various topologies for larger (e.g., 5×5 or greater) arrays modeled with wiring losses. More specifically, key contributions presented herein include: (i) A regularized deep neural network architecture with dropout and batchnorm for PV topology reconfiguration for topology selection based on observed operating data; (ii) Expanding optimization across additional possible PV topologies by including a honeycomb topology in addition to series-parallel, bridge-link and total cross tied; (iii) Analysis on the merit of topology reconfiguration under modeled wiring losses; and (iv) Extensive simulations on a 5×5 array to demonstrate more realistic results. During validation, the system was found to achieve an average test accuracy of 83% and an F1 score of 0.83. The system presented herein incorporates wiring losses in its model and implements an optimized deep neural network architecture that guides dynamic switching across different topologies, resulting in an average power improvement of approximately 11% when switching from a series-parallel topology to other topologies.

It is appreciated that the illustrated devices and structures may include a plurality of the same component referenced by the same number. It is appreciated that depending on the context, the description may interchangeably refer to an individual component or use a plural form of the given component(s) with the corresponding reference number.

Approach

Reconfiguring photovoltaic (PV) array connections among different topologies such as series-parallel, bridge-link, honeycomb or total cross tied is a viable strategy to mitigate impediments in power production caused by partial shading. Conventional approaches rely on by-passing shaded modules in an array by connecting auxiliary unshaded panels through complex control mechanisms or utilizing a simulator-driven approach to predict the best topology. However, these solutions are not scalable and incur significant installation costs and computational overhead motivating the need to develop 'smart' and automated methods for topology reconfiguration. To this end, the present disclosure outlines the system implementing a regularized neural network that leverages panel-level sensor data from a PV array to reconfigure the PV array to a topology that maximizes the power output under arbitrary shading conditions. Based on extensive simulations that include modeling of wiring losses in different configurations, power improvement is observed through reconfiguration. The system is scalable and can be easily deployed in any reconfigurable PV array.

Figure 1B:
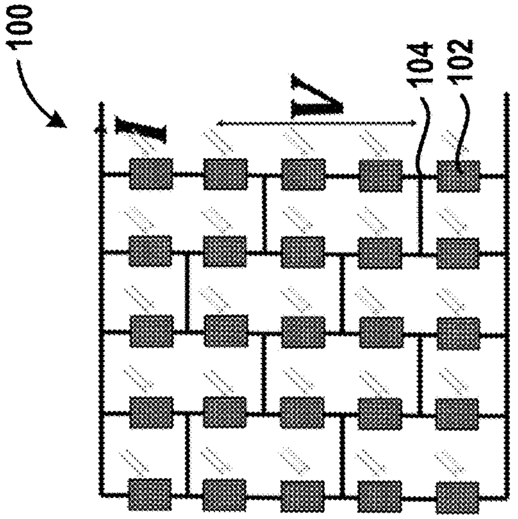
Figure 1C:
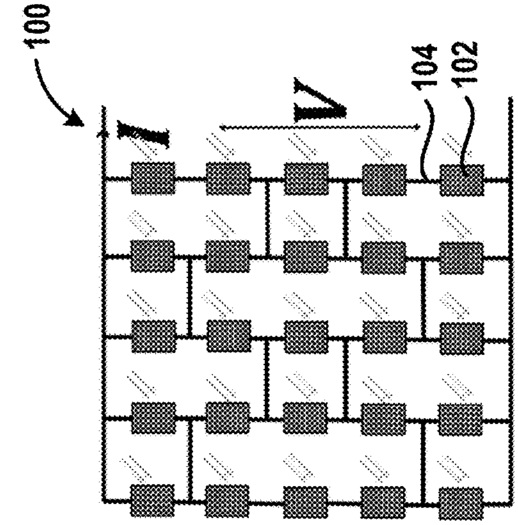
Figure 1D:
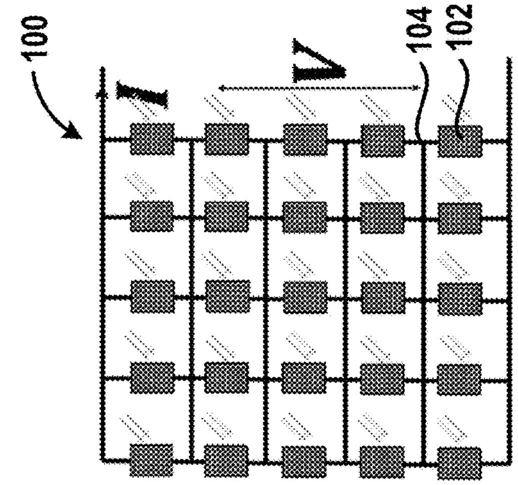

FIGS. 1A-1D show a PV array 100 assuming different topologies discussed herein. FIG. 1A shows the PV array 100 having a plurality of panels 102 connected by a plurality of linkages 104 in a Series-Parallel (SP) topology. FIG. 1B shows the PV array 100 having panels 102 connected by linkages 104 in a Bridge-Link (BL) topology. FIG. 1C shows the PV array 100 having panels 102 connected by linkages 104 in a Honeycomb (HC) topology. FIG. 1D shows the PV array 100 having panels 102 connected by linkages 104 in a Total-cross-tied (TCT) topology.

Figure 2A:
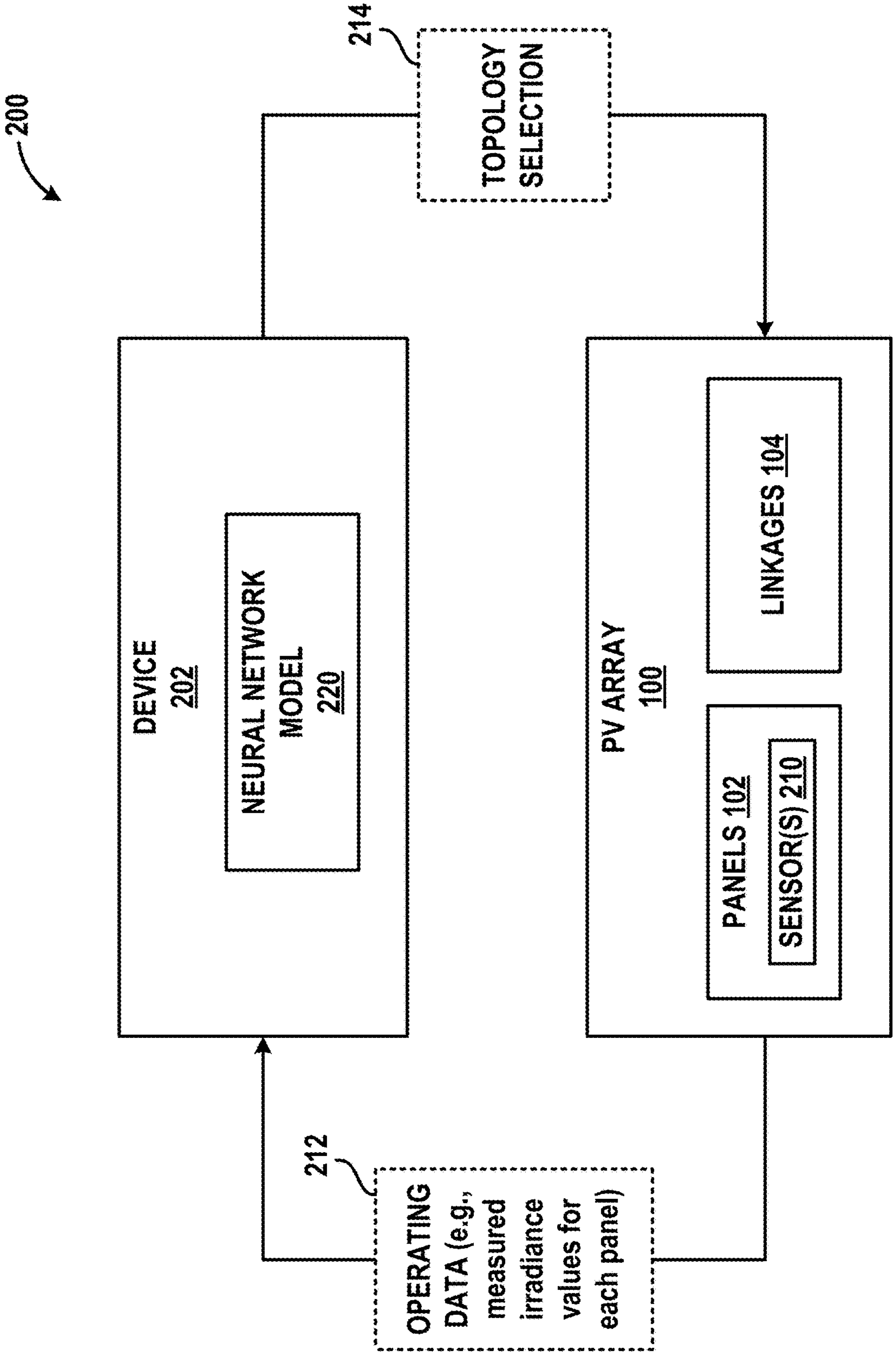
FIG. 2A is a simplified diagram showing a system for photovoltaic topology reconfiguration.

FIG. 2A shows an embodiment of a PV Topology Reconfiguration system (hereinafter, "system 200") including a device 202 having a neural network model 220 formulated at a processor of the device 202. In a primary embodiment, the neural network model 220 is a deep neural network model. The device 202 can communicate with or otherwise receive operating data 212 from a reconfigurable PV array (e.g., PV array 100) as shown; the PV array 100 can include the plurality of panels 102 connected by the plurality of linkages 104. The plurality of panels 102 can be operable for capturing photons and converting energy from the captured photons into electricity. The operating data 212 can include measured solar irradiance values for one or more panels 102 of the plurality of panels 102. Based on the operating data 212 for the plurality of panels 102, the device 202 determines an optimal configuration of the PV array 100 to maximize power output under variable conditions (e.g., shading conditions) and generates a topology selection 214 for the PV array 100.

The PV array 100 can include one or more sensor(s) 210 associated with one or more panels 102 that measure the operating data 212, which can be communicated over wired or wireless connection to the device 202. The one or more sensor(s) 210 are operable for capturing operating data including an irradiance value resultant of light on the panel 102. The device 202 can be onboard the PV array 100 or can be positioned elsewhere for communication with the PV array 100.

Once the device 202 determines a topology selection 214 based on the operating data 212, the device 202 can communicate the topology selection 214 to the PV array 100 to re-configure the topology of the PV array 100. In some embodiments, the PV array 100 may be operable for re-configuring the linkages 104 based on the topology selection 214. In other embodiments, the device 202 can be operable for generating and sending control signals to the linkages 104 or other hardware of the PV array 100 to enable the PV array 100 to assume a new topology based on the topology selection 214. One or more linkages 104 of the plurality of linkages 104 can be selectively configurable according to a topology configuration of a plurality of topology configurations, including but not limited to: SP configuration, BL configuration, HC configuration, and TCT configuration. Importantly, system 200 outlined herein does not require additional (secondary panels) for reconfiguration. In other words, the system 200 can be used in scenarios where there is support for static reconfiguration.

Neural Network Model

Figure 2B:
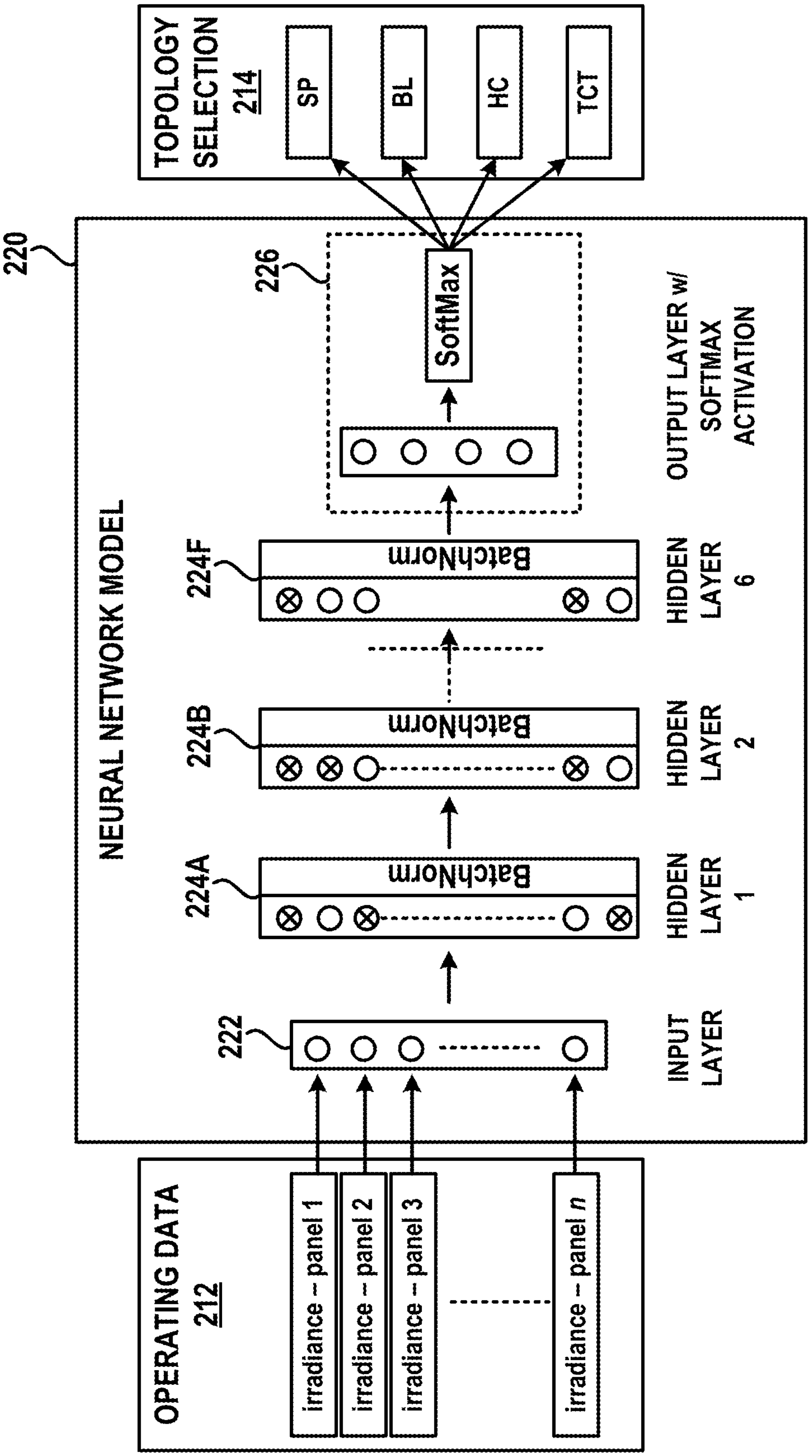
FIG. 2B is a simplified diagram showing a neural network model of the system of FIG. 2A.

FIG. 2B shows the neural network model 220 formulated at a processor of device 202 (FIG. 2A) that receives the operating data 212, which can include measured solar irradiance values for each respective panel and determines the topology selection 214 based on the operating data 212. The neural network model 220 can be a deep neural network model. The input to the neural network model 220 is an n-dimensional feature vector corresponding to the irradiance on every panel (e.g., for n panels 102 of the PV array 100). Hidden layers of the neural network model 220 progressively transform the input features by introducing non-linear activations (ReLU). Dropout and batchnorm regularization is introduced between every layer. An output layer of the neural network model 220 is a softmax activation function which provides the normalized probabilities that will ultimately determine the optimum topology. Broadly, for a given set of panel level irradiances, the system 200 optimally selects one of the four PV topologies that can provide power improvements. The neural network model 220 is well regularized, thereby offering parameter efficiency, and is less prone to overfitting issues. The following discussion below provides details about development, training and implementation of the system 200, including synthetic data generation, problem formulation, simulation setup, and design of the neural network model 220.

Figure 2C:
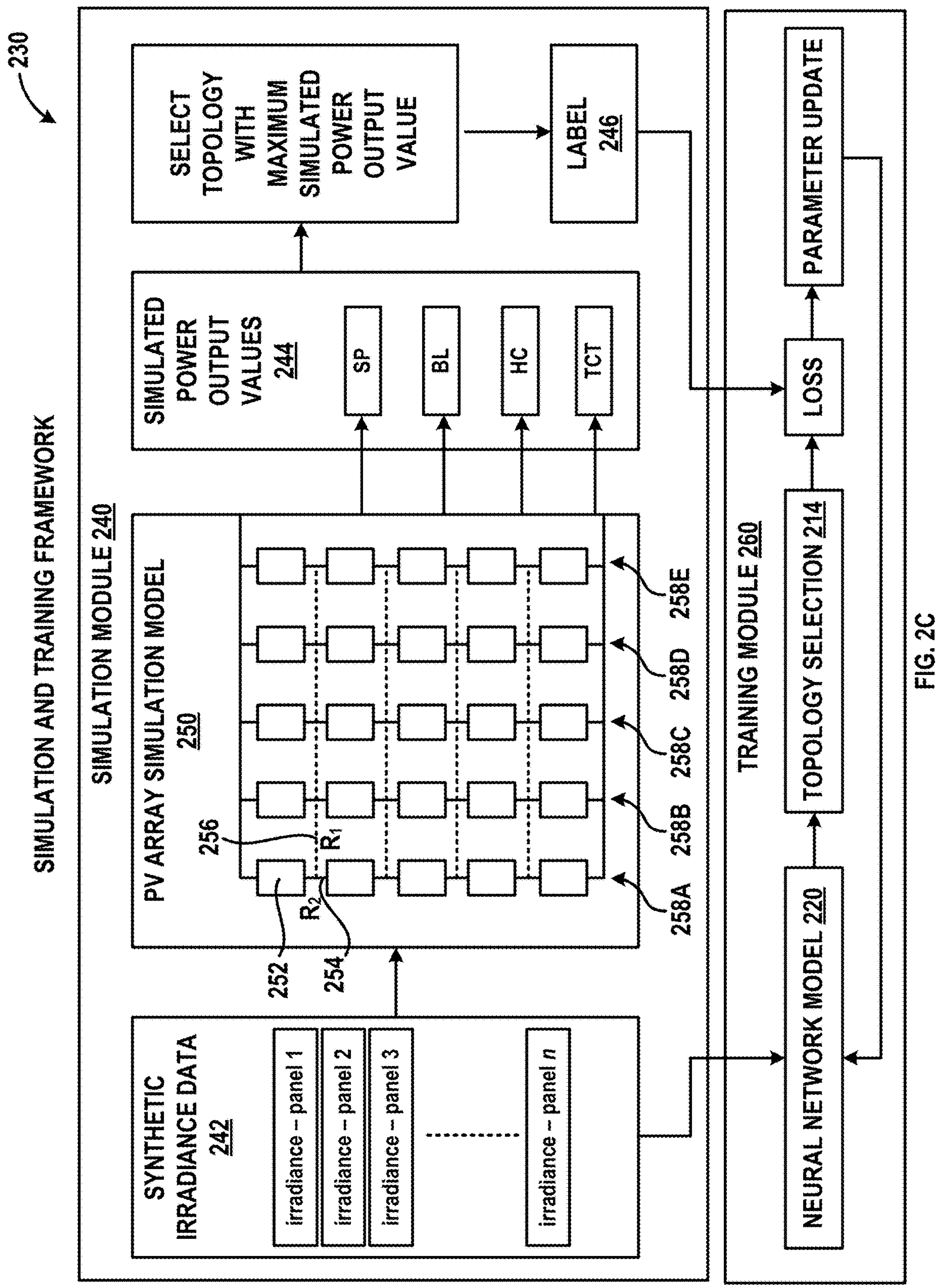
FIG. 2C is a simplified diagram showing a simulation and training framework for training the neural network model of FIGS. 2A and 2B.

FIG. 2C shows a simulation and training framework 230 including a simulation module 240 and a training module 260 that trains the neural network model 220 to correctly determine an optimal topology to maximize power output given irradiance data. The simulation module 240 can generate synthetic irradiance data 242 and apply the synthetic irradiance data 242 to a PV array simulation model 250 to obtain simulated power output values 244 for each topology configuration. The simulation module 240 selects the topology configuration that results in a maximum simulated power output value to be a label 246 for the associated synthetic irradiance data 242. These labels 246 along with the corresponding synthetic irradiance data 242 are then employed by the training module 260 to train the neural network model 220. At the training module 260, the synthetic irradiance data 242 is provided as input to the neural network model 220, which provides a topology selection 214 based on the synthetic irradiance data 242. The training module 260 then determines a loss between the label 246 for the synthetic irradiance data 242 and the associated topology selection 214 outputted by the neural network model 220. Based on the loss, the training module 260 updates one or more parameters of the neural network model 220. This process can be iteratively repeated as needed with new synthetic irradiance data 242 and associated labels 246 to train the neural network model 220.

Importantly, the structure of the neural network model 220 enables the neural network model 220 to be well-regularized and avoid overfitting during the training process. Each hidden layer of the neural network model 220 applies an affine transformation followed by a non-linear activation function (Rectified Linear Unit—ReLU), with application of a dropout policy and batchnorm on the features from the previous layer during training. The dropout policy randomly sets the weights and gradients of p % of the neurons in each hidden to "zero" during every training iteration, thereby regularizing the neural network model 220 and preventing overfitting. Further, batchnorm at the output of each respective hidden layer handles internal covariate shifts between every layer and leads to faster convergence.

Further, the neural network model 220 can be trained to account for wiring losses that may vary based on a topology exhibited by a PV array. The below discussion provides details on generation of the synthetic irradiance data 242 with modeled wiring losses for training the neural network model 220. By training the neural network model 220 on the synthetic irradiance data 242 generated using the simulation module 240 discussed herein, the neural network model 220 can inherently incorporate into its decision-making process tradeoffs associated with wiring losses that result from different topology configurations.

A. Data Generation

Figure 3:
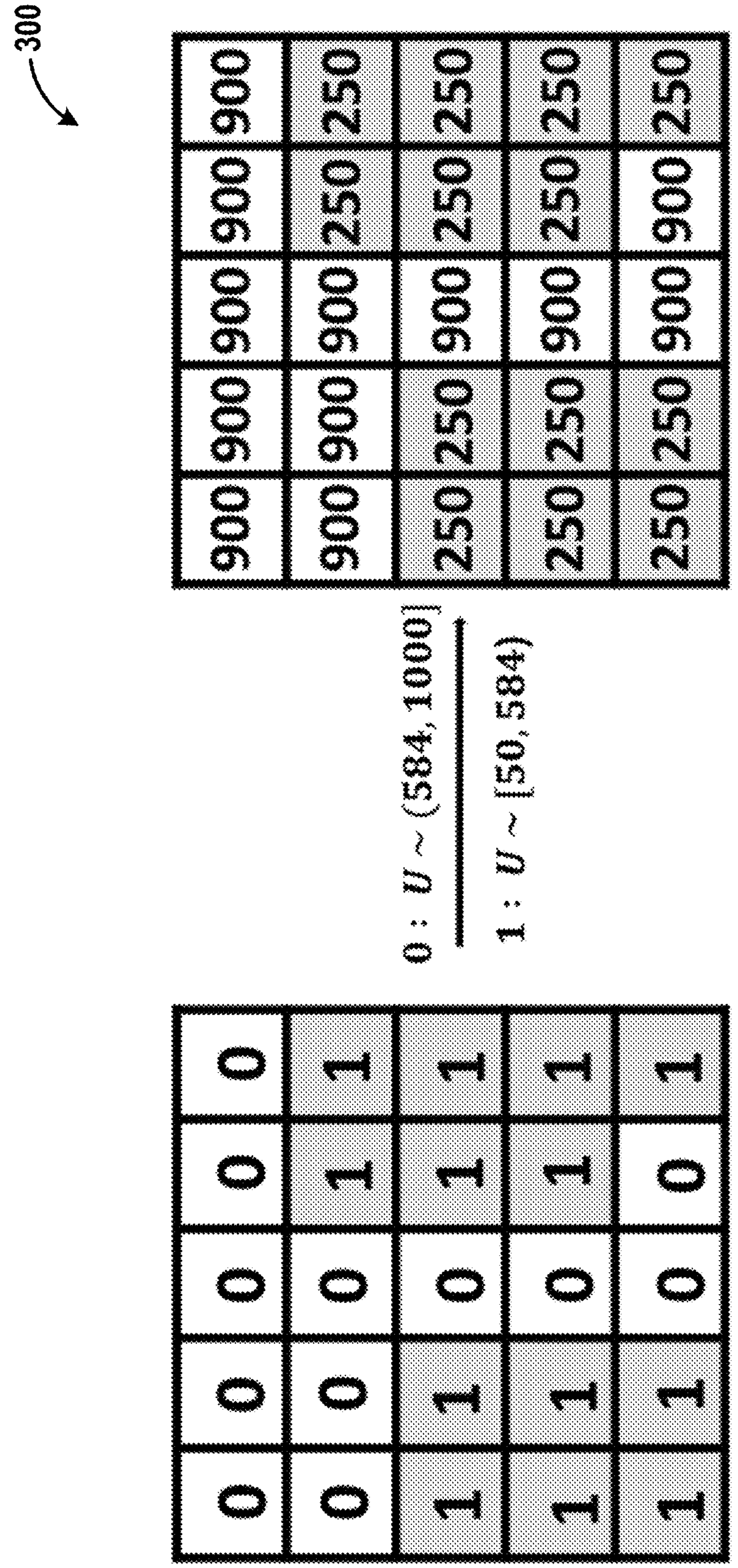
FIG. 3 is a graphical representation showing a binary mapping scheme for generating a labeled training dataset for partial shading testing according to the simulation and training framework of FIG. 2C.

Sample panel-level irradiances (e.g., synthetic irradiance data 242) for a 5×5 PV array can be generated using a binary mapping scheme, where "0" is assigned to panels that are unshaded and "1" is assigned to panels that are unshaded. FIG. 3 shows an example binary-mapping graph 300 showing sample panel-level irradiances for a 5×5 array. The irradiance (irr) associated with either 0 or 1 can be independently drawn from one of the following uniform distributions:

$$0 \rightarrow \text{irr} \sim \mathcal{U}[\alpha, 1000] \tag{1}$$

$$1 \rightarrow \text{irr} \sim \mathcal{U}[50, \alpha], \tag{2}$$

where $\alpha$=586 W/$m^2$ is the threshold chosen for considering whether a panel is shaded or not. The same irradiance realization is used for the unshaded (0) and shaded (1) panels respectively in the array. As shown in FIG. 3, the set of irradiances assigned to the panels 1, . . . , 25 correspond to a partial shading scenario.

In one implementation, a comprehensive dataset of synthetic irradiance data was generated including 8,000 irradiance instances covering a wide range of partial shading scenarios by sampling these uniform distributions for randomly chosen binary assignments.

PV topology reconfiguration as considered by the system 200 can be posed as a supervised classification problem. A dataset $$\{(x_i, y_i)\}_{i=1}^{M}$$

can be constructed where $x_i \in \mathbb{R}^n$ denotes the input (e.g., operating data 212, including irradiance instances measured at each respective panel 102 of FIGS. 1A-1D; during simulation by the simulation module 240, inputs correspond to synthetic irradiance data 242 of FIG. 2C) with dimension n corresponding to the number of panels 102 in the PV array 100 (e.g., n=25 for a 5×5 array). One implementation of the system 200 was found to successfully handle PV topology reconfiguration for a 5×5 PV array. Here, $y_i \in \{1,2,3,4\}$ denotes a set of labels associated with every $x_i$ (e.g., for four total topology configurations, however this can be extended to include any other quantity of topology configurations to be considered) and M denotes the number of instances in the dataset. To obtain the set of labels (e.g., label(s) 246 shown in FIG. 2C) corresponding with the set of inputs for simulated data generation, the label $y_i$ is obtained by: (i) simulating power generation for the PV array 100 for different topologies (e.g., including the SP, BL, HC and TCT topologies) on MATLAB-Simulink for a given $x_i$ at a constant temperature of 25° C.; and (ii) determining the topology that produces the maximum power (MPP) given the shading conditions indicated within the input data. Let $P_1=P_{SP}$, $P_2=P_{BL}$, $P_3=P_{HC}$ and $P_4=P_{TCT}$ be the MPPs for the respective topologies for a given $x_i$. Therefore:

$$y_i = \underset{j}{\operatorname{argmax}} P_j \forall j \in \{1 \ldots 4\}. \tag{3}$$

B. Simulation Setup:

Each panel 102 of the PV array 100 can be represented as a by-pass diode in parallel. As such, the PV array simulation model 250 illustrated in FIG. 2C includes a plurality of simulated panels 252 that can be arranged in "strings" 258A-258E as shown. The plurality of simulated panels 252 are connected by a plurality of simulated linkages. Importantly, the PV array simulation model 250 incorporates wiring losses at each simulated linkage; a distinction is made between a first subset 254 of the plurality of simulated linkages that connect two or more simulated panels 252 within the same string (e.g., a first string 258A), and a second subset 256 of the plurality of simulated linkages that connect two or more simulated panels 252 between adjacent strings (e.g., the first string 258A and a second string 258B). In this example, the second subset 256 of the plurality of simulated linkages are reconfigurable, and can be selectively "activated" or "deactivated" to configure the PV array simulation model 250 according to different topologies. When a simulated linkage is "activated", the PV array simulation model 250 incorporates a resistance value of $R_1$=0.01Ω and establishes a connection across the simulated linkage. When a simulated linkage is "deactivated", the PV array simulation model 250 removes the simulated linkage entirely and/or incorporates a substantially high resistance value (e.g., approaching infinity when compared to respect to $R_1$, but for practical purposes would be a very high resistance value such as ~1 MΩ) to model zero or negligible current through the simulated linkage.

For a first simulated topology configuration, each simulated linkage of the second subset 256 is "deactivated" to configure the PV array simulation model 250 according to the SP topology configuration. For a second simulated topology configuration, each simulated linkage of the second subset 256 is selectively activated or deactivated to configure the PV array simulation model 250 according to the BL topology configuration. For a third simulated topology configuration, each simulated linkage of the second subset 256 is activated or deactivated to configure the PV array simulation model 250 according to the HC topology configuration. For a fourth simulated topology configuration, each simulated linkage of the second subset 256 is activated to configure the PV array simulation model 250 according to the TCT topology configuration.

Wiring losses representing re-configurable links and conditions of the PV array 100 can be modeled at the PV array simulation model 250 using resistors placed between each of the linkages originating or terminating at the panels. Importantly, the wire loss is dependent upon a simulated topology configuration exhibited by the PV array simulation model 250. Specifically, one embodiment of the PV array simulation model 250 used a resistance of $R_1=0.01\Omega$ to model the wiring losses between the panels connected by linkages across adjacent strings (e.g., for linkages belonging to the first subset 254) and a resistance $R_2=0.005\Omega$ to model the wiring losses between panels connected by linkages between the panels of a string (e.g., for linkages belonging to the second subset 256). While the embodiments discussed herein are shown with a 5×5 PV array as an example, the system and methods outlined above can be applied to larger or smaller PV arrays of other dimensions.

Generating synthetic irradiance data representing a PV array of any dimension, modeling resultant power generation incorporating wire losses for re-configurable links, and training the neural network model 220 to identify the best topology for a shading condition enables adaptability of the system 200.

C. Design of the Regularized Neural Network

Neural networks (NNs) have produced state-of-the-art performance in a variety of applications including PV array fault detection. As shown in FIG. 2B, the neural network model 220 can be a multi-layered, feed-forward deep NN model with dropout and batchnorm at each hidden layer to perform topology reconfiguration. In the example shown, the total quantity of hidden layers is six, however this quantity can be modified as needed. In particular, the neural network model 220 receives operating data 212, which includes a set of measured irradiance values for the plurality of panels 102 of the PV array 100. In one example implementation, the set of measured irradiance values includes at least one instance for each respective panel 102; in other embodiments, the set of measured irradiance values includes at least one instance for a group of panels 102. In the example shown, the set of measured irradiance values includes one observed irradiance value for each panel 102 of n total panels.

The example of FIG. 2B shows the neural network model 220 having an input layer 222, a plurality of hidden layers (e.g., hidden layers 224A-224F), an output layer 226 that implements a softmax activation function. As shown, the operating data 212 (e.g., an n-dimensional irradiance instance) is passed to the input layer 222, which includes a plurality of input layer neurons; the quantity of input layer neurons of the input layer 222 can correspond with the quantity of operating data 212 (e.g., for n irradiance values respectively corresponding to n panels 102 of the PV array 100, the input layer 222 can include n input layer neurons). An output of the input layer 222 can be passed to a first hidden layer 224A, which can apply dropout for one or more neurons of the first hidden layer 224A and batchnorm at an output of the first hidden layer 224A. An output of the first hidden layer 224A can be passed to a second hidden layer 224B, which can apply dropout for one or more neurons of the second hidden layer 224B and batchnorm at an output of the second hidden layer 224B. This convention can continue until a final hidden layer (e.g., a sixth hidden layer 224F) is reached, which can include dropout for one or more neurons of the final hidden layer and batchnorm at an output of the final hidden layer. A (normalized) output of the final hidden layer can be passed to the output layer 226, where a total quantity of output layer neurons of the output layer 226 can correspond with the total quantity of topology selections 214 (e.g., for four total topologies including SP, BL, HC and TCT, the output layer 226 can include four output layer neurons). The output layer 226 can include a softmax activation function, and outputs the topology selection 214 (e.g., SP, BL, HC or TCT) based on the operating data 212 received at the input layer 222.

In one implementation, the number of neurons for the hidden layers 224A-224F were respectively chosen to be 64, 64, 128, 256, 64 and 64. Each hidden layer 224A-224F of the neural network model 220 applies an affine transformation followed by a non-linear activation function (Rectified Linear Unit—ReLU), with application of a dropout policy and batchnorm on the features from the previous layer. As discussed above, the dropout policy randomly sets the weights and gradients of p % (p=0.2 in one example) of the neurons in a layer (e.g., hidden layers 224A-224F) to zero during every training iteration thereby regularizing the neural network model 220 and preventing overfitting. Application of batchnorm at the output of each respective hidden layer tackles internal covariate shifts between every layer and leads to faster convergence.

The categorical label $\hat{y}_i$ is predicted as follows from the output layer 226 including 4 neurons with the softmax activation function applied at the output layer 226:

$$\hat{y}_i = \underset{j}{\operatorname{argmax}} \frac{\exp(z_{i,j})}{\sum_{j=1}^{C} \exp(z_{i,j})} \forall\, j \in \{1 \ldots 4\}, \tag{4}$$

where $z_{i,j}$ represents the $j^{th}$ logit learned by the output layer 226 for the $i^{th}$ sample and C=4 represents the number of topologies. 90% of the simulated dataset was used for training the neural network model 220 (scaled to have zero mean and unit variance) the remaining 10% was used for testing the neural network model 220. During training, the neural network model 220 can be optimized using categorical cross entropy loss with Adam optimizer for 200 epochs with a learning rate of $10^{-3}$. FIG. 2C shows one example implementation of the training module 260 that can be applied to train the neural network model 220.

Results and Discussion

A. System Performance

Figure 4:
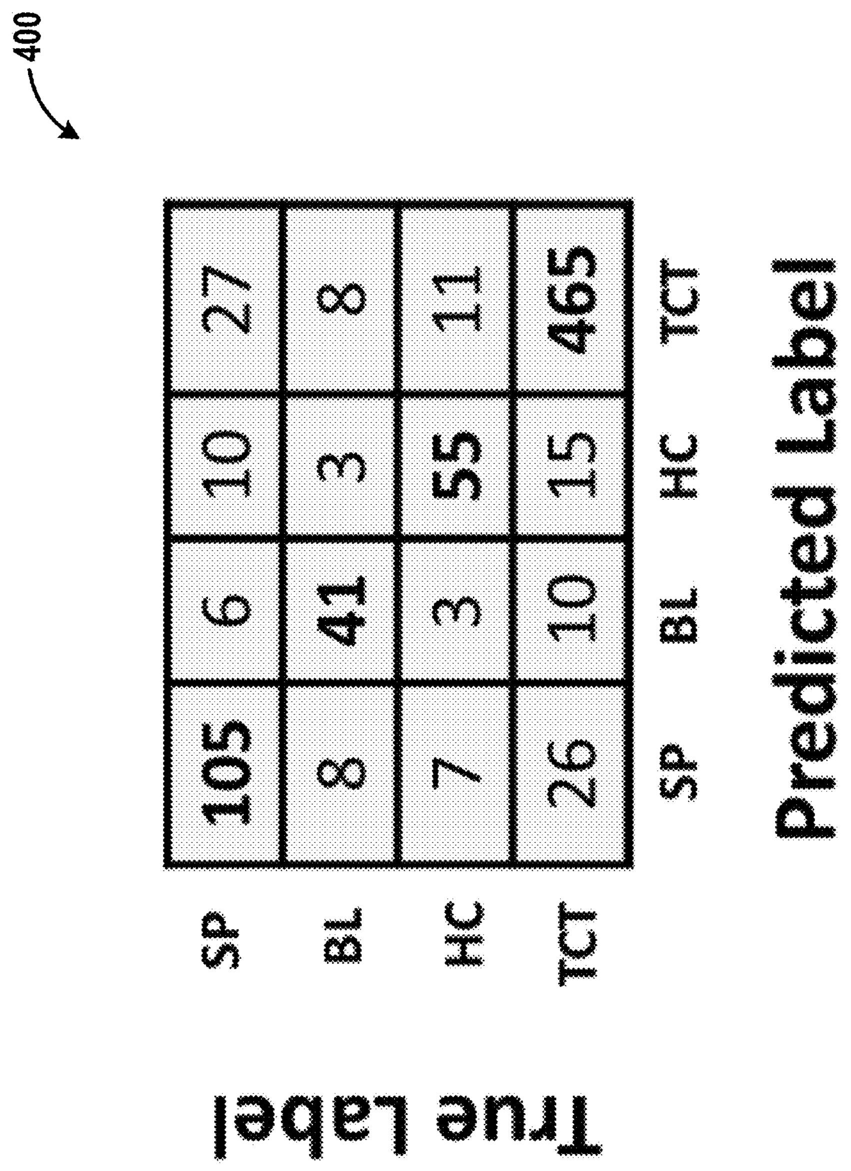
FIG. 4 is a graphical representation showing a resultant confusion matrix from implementing the system of FIGS. 2A and 2B on a test dataset.

FIG. 4 shows a confusion matrix that quantifies the performance of the system 200 on the testing dataset (e.g., the 10% of the synthetic dataset discussed above). The confusion matrix 400 provides a measure of class-wise performance. It can be observed that the number of examples that are correctly classified (main diagonal) outweighs the number of misclassified examples (off-diagonal) indicating the generalizing capability of the system 200. Using different train-test splits, the average test accuracy was determined to be ≈83% with an F1 score of 0.83.

B. Merit of PV Topology Reconfiguration

In this subsection, the viability of topology reconfiguration for a wide range of partial shading scenarios is assessed. The assessment determines the number of cases where reconfiguring from one (current) topology to another (switched) topology for that irradiance instance produces a power improvement ($P_{imp}$) greater than a specified threshold. For example, by assuming SP to be the 'current' topology, the number of cases where the 'switched' topology produces maximum power across the four topologies is found. Power improvement is defined as $P_{imp}=P_{switched}-$ $P_{current}$ where $P_{switched}$ and $P_{current}$ are the MPPs of the switched and current topologies. For quantitative evaluation, considering SP as the current topology, the percentage of cases where $P_{imp}>\gamma$ while switching to other topology classes (BL, HC and TCT) is determined. Here, an empirical threshold $\gamma$=SOW is considered. Using simulated data, one assessment found that the percentage of cases of switching from SP to BL, HC and TCT were observed at 72.32%, 68.44% and 84.5% respectively. In addition, the average percentage improvement in power when switching from SP to the other topologies was found to be approximately 11%. These illustrate that even under modeled losses optimizing the topology of the solar array can still lead to significant power improvements. As such, the system 200 is scalable and can be effectively utilized to perform the reconfiguration.

Computing Device

Figure 5:
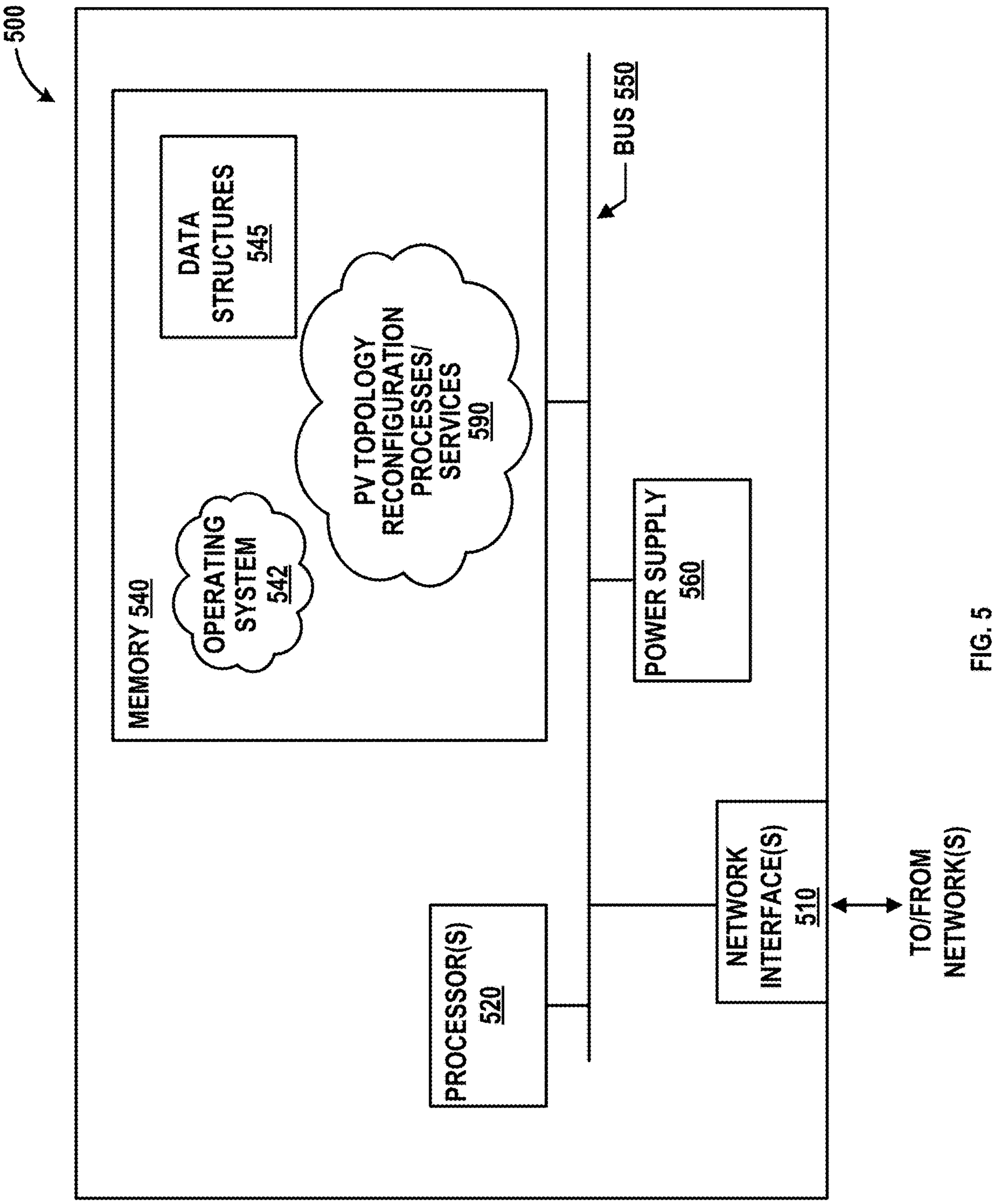
FIG. 5 is a simplified diagram showing an example computing device for implementation of the system of FIGS. 2A-2C.

FIG. 5 is a schematic block diagram showing an example device 500 that may be used with one or more embodiments described herein, e.g., as a component of system 200 and/or as device 202 shown in FIG. 2A.

Device 500 comprises one or more network interfaces 510 (e.g., wired, wireless, PLC, etc.), at least one processor 520, and a memory 540 interconnected by a system bus 550, as well as a power supply 560 (e.g., battery, plug-in, etc.). The neural network model 220 (FIGS. 2A-2C) and the simulation and training framework 230 can be implemented or otherwise formulated at the processor 520 (e.g., the same processor, or different processors).

Network interface(s) 510 include the mechanical, electrical, and signaling circuitry for communicating data over the communication links coupled to a communication network. Network interfaces 510 are configured to transmit and/or receive data using a variety of different communication protocols. As illustrated, the box representing network interfaces 510 is shown for simplicity, and it is appreciated that such interfaces may represent different types of network connections such as wireless and wired (physical) connections. Network interfaces 510 are shown separately from power supply 560, however it is appreciated that the interfaces that support PLC protocols may communicate through power supply 560 and/or may be an integral component coupled to power supply 560.

Memory 540 includes a plurality of storage locations that are addressable by processor 520 and network interfaces 510 for storing software programs and data structures associated with the embodiments described herein. In some embodiments, device 500 may have limited memory or no memory (e.g., no memory for storage other than for programs/processes operating on the device and associated caches).

Processor 520 comprises hardware elements or logic adapted to execute the software programs (e.g., instructions) and manipulate data structures 545. An operating system 542, portions of which are typically resident in memory 540 and executed by the processor, functionally organizes device 500 by, inter alia, invoking operations in support of software processes and/or services executing on the device. These software processes and/or services may include photovoltaic topology reconfiguration processes/services 590. Note that while photovoltaic topology reconfiguration processes/services 590 is illustrated in centralized memory 540, alternative embodiments provide for the process to be operated within the network interfaces 510, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the photovoltaic topology reconfiguration processes/services 590 is shown as a standalone process, those skilled in the art will appreciate that this process may be executed as a routine or module within other processes.

Methods

Figure 6A:
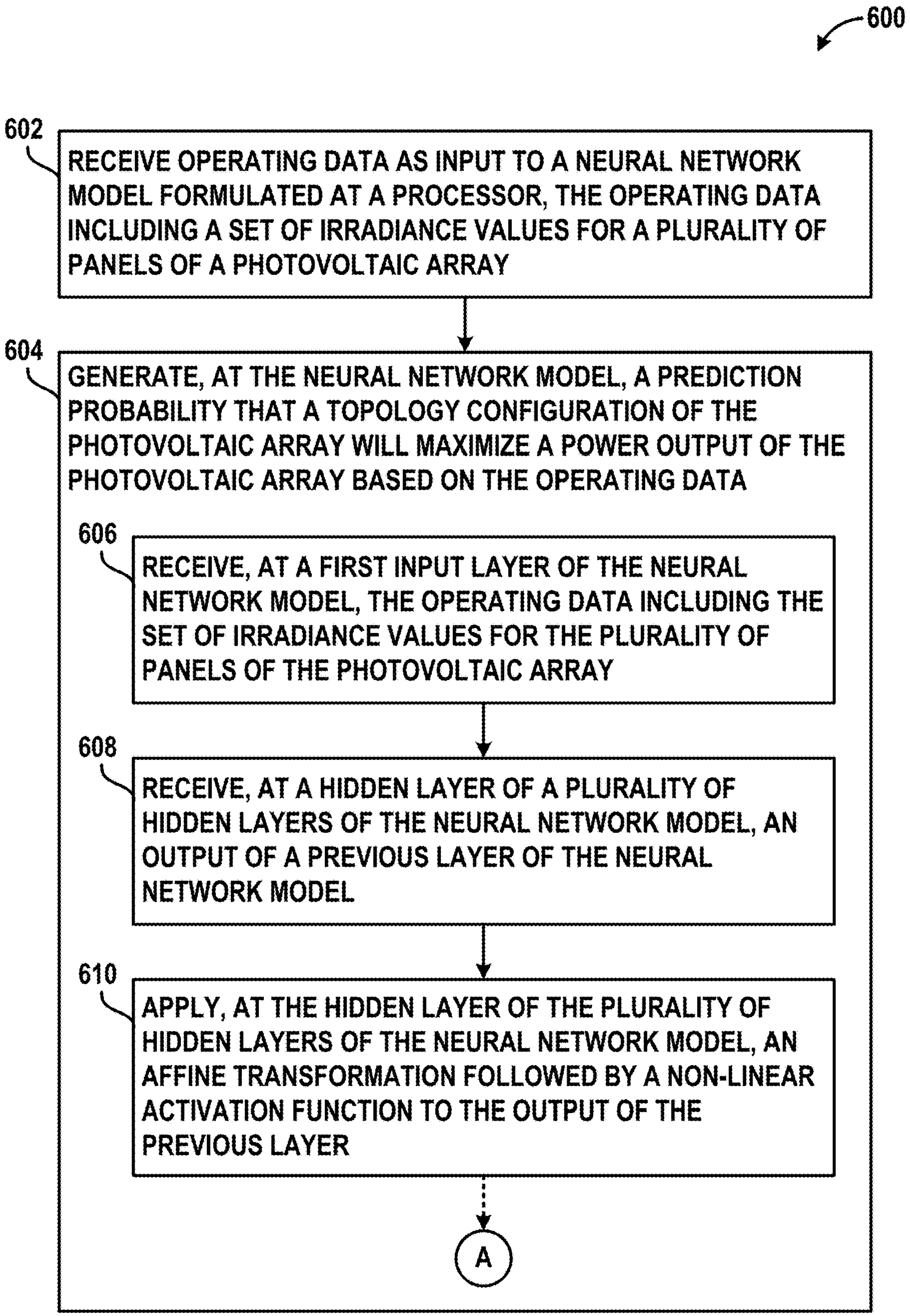
FIGS. 6A-6C are a series of process flow diagrams showing a method for photovoltaic topology reconfiguration according to the system of FIGS. 2A and 2B.
Figure 6B:
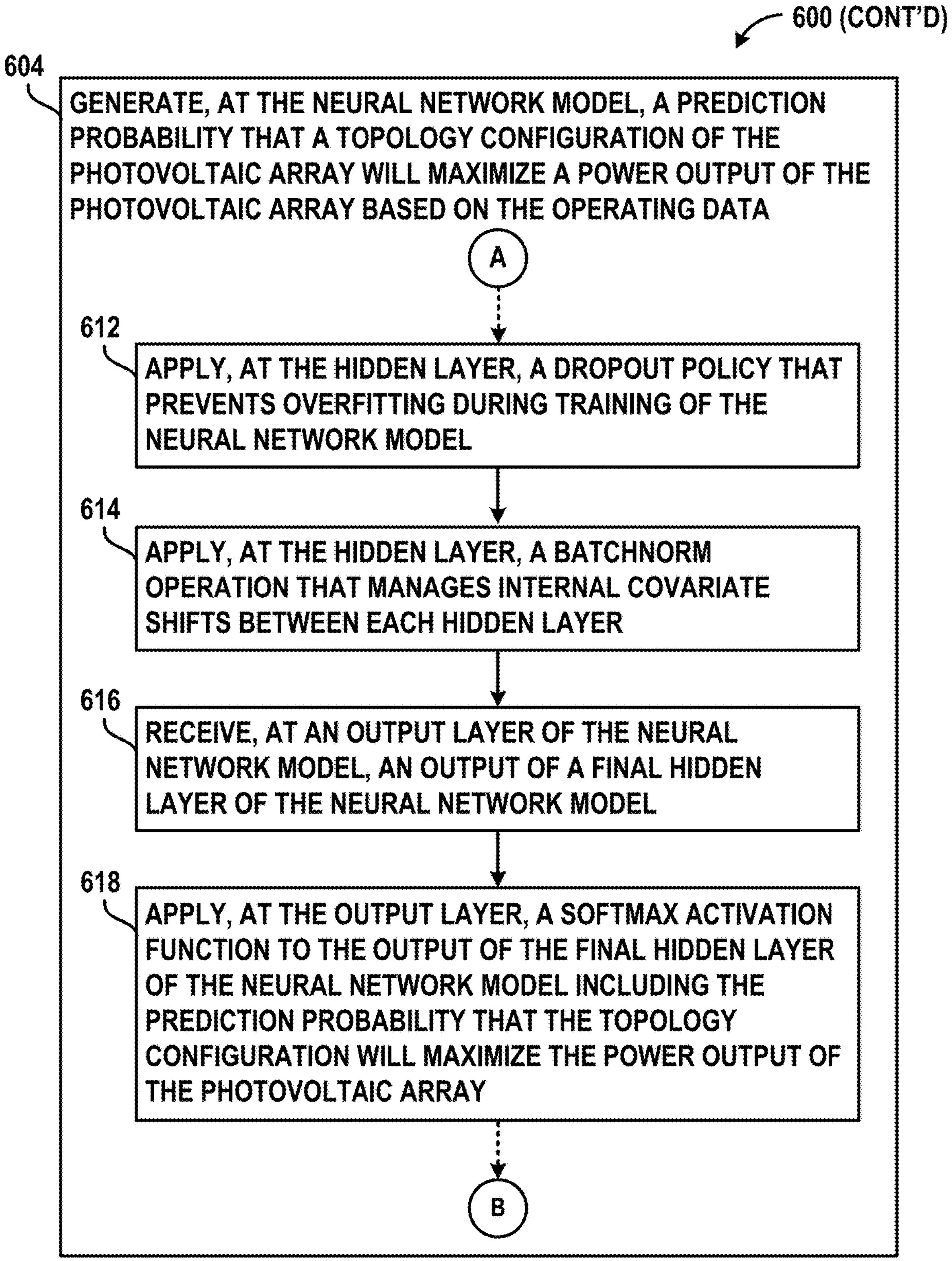
Figure 6C:
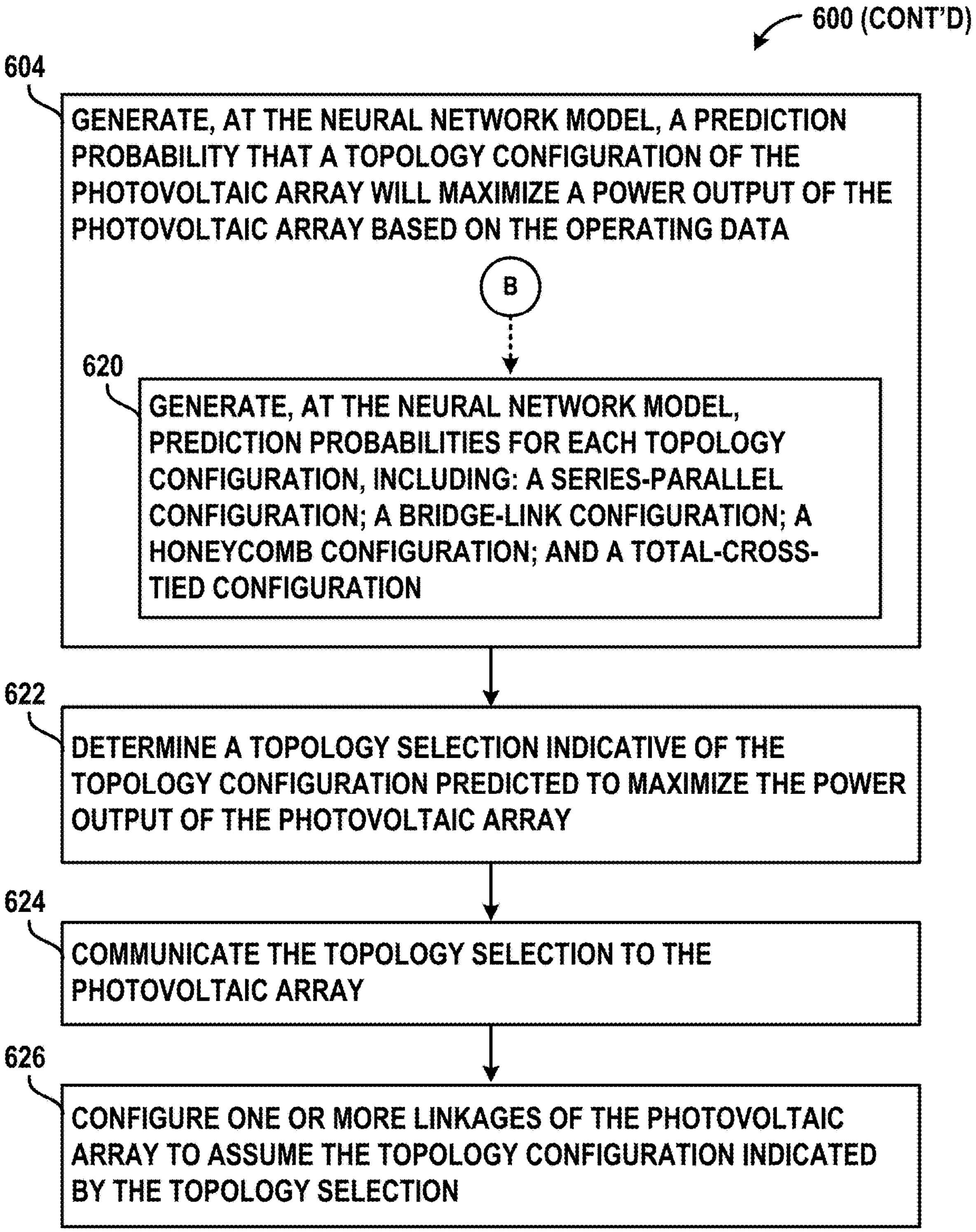

FIGS. 6A-6C are a series of process flow diagrams showing a method 600 for photovoltaic topology reconfiguration according to the systems outlined herein. The method 600 can be part of the photovoltaic topology reconfiguration processes/services 590 shown in FIG. 5 implementing aspects of the system 200 shown in FIGS. 2A and 2B.

With reference to FIG. 6A, step 602 of method 600 includes receiving operating data as input to a neural network model formulated at a processor, the operating data including a set of irradiance values for a plurality of panels of a photovoltaic array. In some embodiments, this entails capturing, at a sensor of a panel of the photovoltaic array, irradiance data indicative of light (and/or shading) conditions incidental on the associated panel. Step 604 of method 600 includes generating, at the neural network model, a prediction probability that a topology configuration of the photovoltaic array will maximize a power output of the photovoltaic array based on the irradiance dataset. In some examples, an additional step can include providing the neural network model and training the neural network model to generate the prediction probability based on the operating data.

As shown, step 604 can include various sub-steps for implementation of the functionality of step 604. For example, step 604 can include step 606, which includes receiving, at a first input layer of the neural network model, the operating data including the set of irradiance values for the plurality of panels of the photovoltaic array. Step 608 of step 604 can include receiving, at a hidden layer of a plurality of hidden layers of the neural network model, an output of a previous layer of the neural network model. Step 610 of step 604 includes applying, at the hidden layer of the plurality of hidden layers of the neural network model, an affine transformation followed by a non-linear activation function to the output of the previous layer. FIG. 6A concludes at circle A.

FIG. 6B shows further sub-steps of step 604, starting at circle A. Step 612 of step 604 includes applying, at the hidden layer, a dropout policy that prevents overfitting during training of the neural network model. Step 614 of step 604 includes applying, at the hidden layer, a batchnorm operation that manages internal covariate shifts between each hidden layer of the plurality of hidden layers. Step 616 of step 604 includes receiving, at an output layer of the neural network model, an output of a final hidden layer of the plurality of hidden layers of the neural network model. Step 618 of step 604 includes applying, at the output layer of the neural network model, a softmax activation function to the output of the final hidden layer of the neural network model including the prediction probability that the topology configuration will maximize the power output of the photovoltaic array. FIG. 6B concludes at circle B.

FIG. 6C shows further steps of method 600, starting at circle B. Step 620 of step 604 includes generating, at the neural network model, prediction probabilities for each topology configuration of the plurality of topology configurations, including: a series-parallel configuration; a bridge-link configuration; a honeycomb configuration; and a total-cross-tied configuration. Step 622 of method 600 follows step 604 and includes determining a topology selection indicative of the topology configuration predicted to maximize the power output of the photovoltaic array (e.g., having the highest prediction probability value). Step 624 of method 600 follows step 622 and includes communicating the topology selection to the photovoltaic array. Step 626 of method 600 follows step 624 and includes configuring one or more linkages of the photovoltaic array to assume the topology configuration indicated by the topology selection.

While the method 600 shown in FIGS. 6A-6C show the steps in one order, the steps of method 600 can be applied in another suitable order or sequence without departing from the spirit and scope of the invention as will be apparent to those skilled in the art. Further, one or more steps of method 600 can be omitted or repeated without departing from the spirit and scope of the invention as will be apparent to those skilled in the art.

Figure 7:
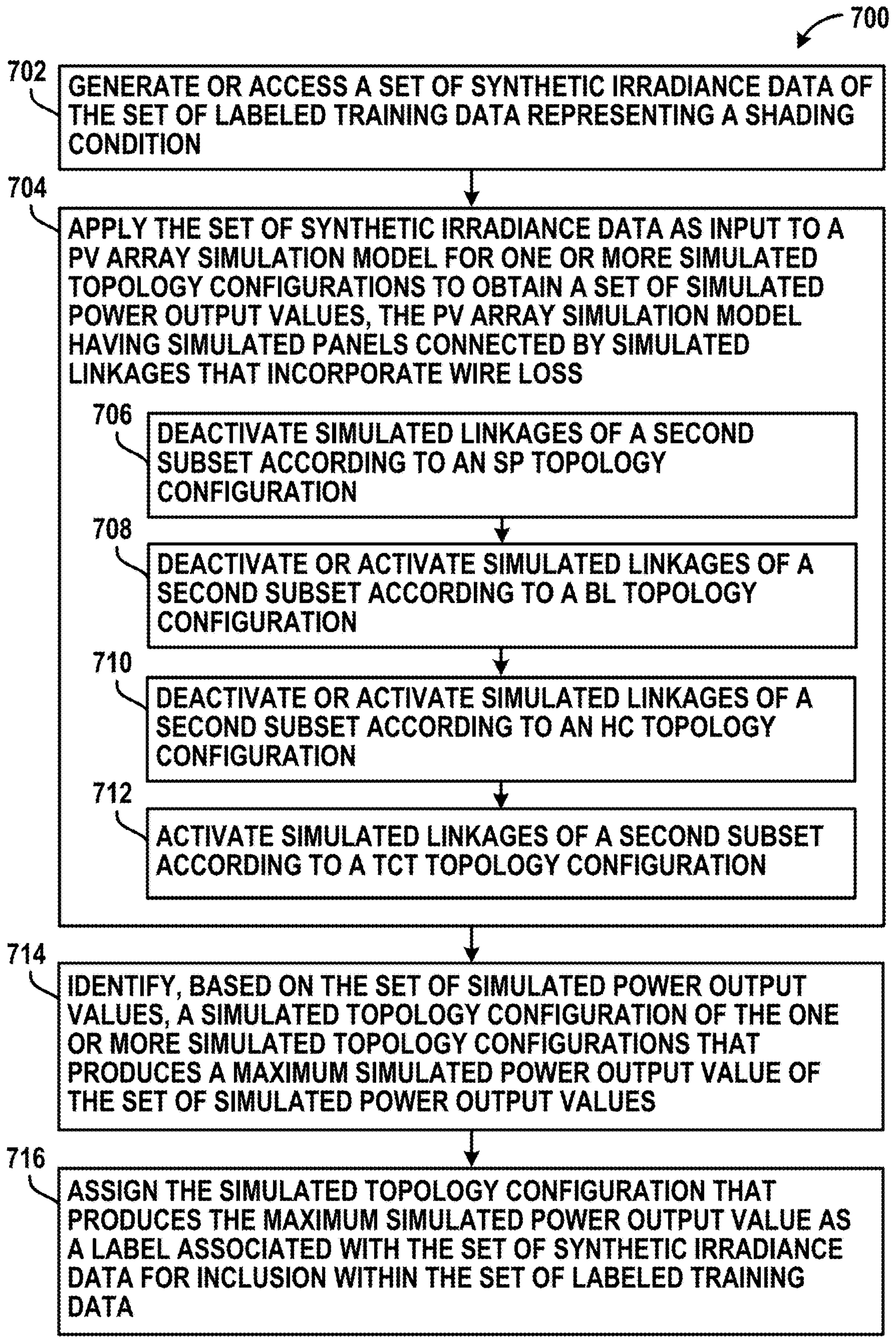
FIG. 7 is a process flow diagram showing a method for generating labeled training data according to the simulation and training framework of FIG. 2C.

FIG. 7 is a process flow diagram showing a method 700 for generating labeled synthetic irradiance data that can eventually be used to training a neural network to perform photovoltaic topology reconfiguration according to the systems outlined herein. The method 700 can be part of the photovoltaic topology reconfiguration processes/services 590 shown in FIG. 5 implementing aspects of the simulation module 240 shown in FIG. 2C.

Step 702 of method 700 includes generating or otherwise accessing a set of synthetic irradiance data of the set of labeled training data representing a shading condition. Step 704 of method 700 follows step 702 and includes applying the set of synthetic irradiance data as input to a PV array simulation model for one or more simulated topology configurations to obtain a set of simulated power output values, the PV array simulation model having simulated panels connected by simulated linkages that incorporate wire loss, where the wire loss is dependent upon a simulated topology configuration exhibited by the PV array simulation model 250.

Step 704 can include various sub-steps, including step 706 of method 700 that includes deactivating simulated linkages of a second subset according to an SP topology configuration (e.g., during simulation, to generate a simulated power output value for the PV array simulation model assuming the SP topology configuration that would result from shading conditions represented by the set of synthetic irradiance data). Step 704 can also include step 708 of method 700 that includes deactivating or activating simulated linkages of the second subset according to a BL topology configuration (e.g., during simulation, to generate a simulated power output value for the PV array simulation model assuming the BL topology configuration that would result from shading conditions represented by the set of synthetic irradiance data). Step 704 can further include step 710 of method 700 that includes deactivating or activating simulated linkages of the second subset according to an HC topology configuration (e.g., during simulation, to generate a simulated power output value for the PV array simulation model assuming the HC topology configuration that would result from shading conditions represented by the set of synthetic irradiance data). Step 704 can also include step 712 of method 700 that includes activating simulated linkages of the second subset according to a TCT topology configuration (e.g., during simulation, to generate a simulated power output value for the PV array simulation model assuming the HC topology configuration that would result from shading conditions represented by the set of synthetic irradiance data). While steps 706-712 are directed to generating simulated power outputs for respective SP, BL, HC and TCT topology configurations, additional steps can be included with respect to simulating power outputs for additional topology configurations to adapt the set of labeled training data accordingly. Further, while steps 706-712 discuss activating and deactivating simulated linkages belonging to the second subset (e.g., of FIG. 2C, where the second subset of linkages connect panels across adjacent strings), these steps can also be applied simultaneously or separately to a first subset of linkages (e.g., of FIG. 2C, where the first subset of linkages connect panels along the same string) to examine how the power output may change with different topology configurations.

Step 714 of method 700 follows step 704 (and associated sub-steps), and includes identifying, based on the set of simulated power output values, a simulated topology configuration of the one or more simulated topology configurations that produces a maximum simulated power output value of the set of simulated power output values. Step 716 of method 700 follows step 714 and includes assigning the simulated topology configuration that produces the maximum simulated power output value as a label associated with the set of synthetic irradiance data for inclusion within the set of labeled training data.

Figure 8:
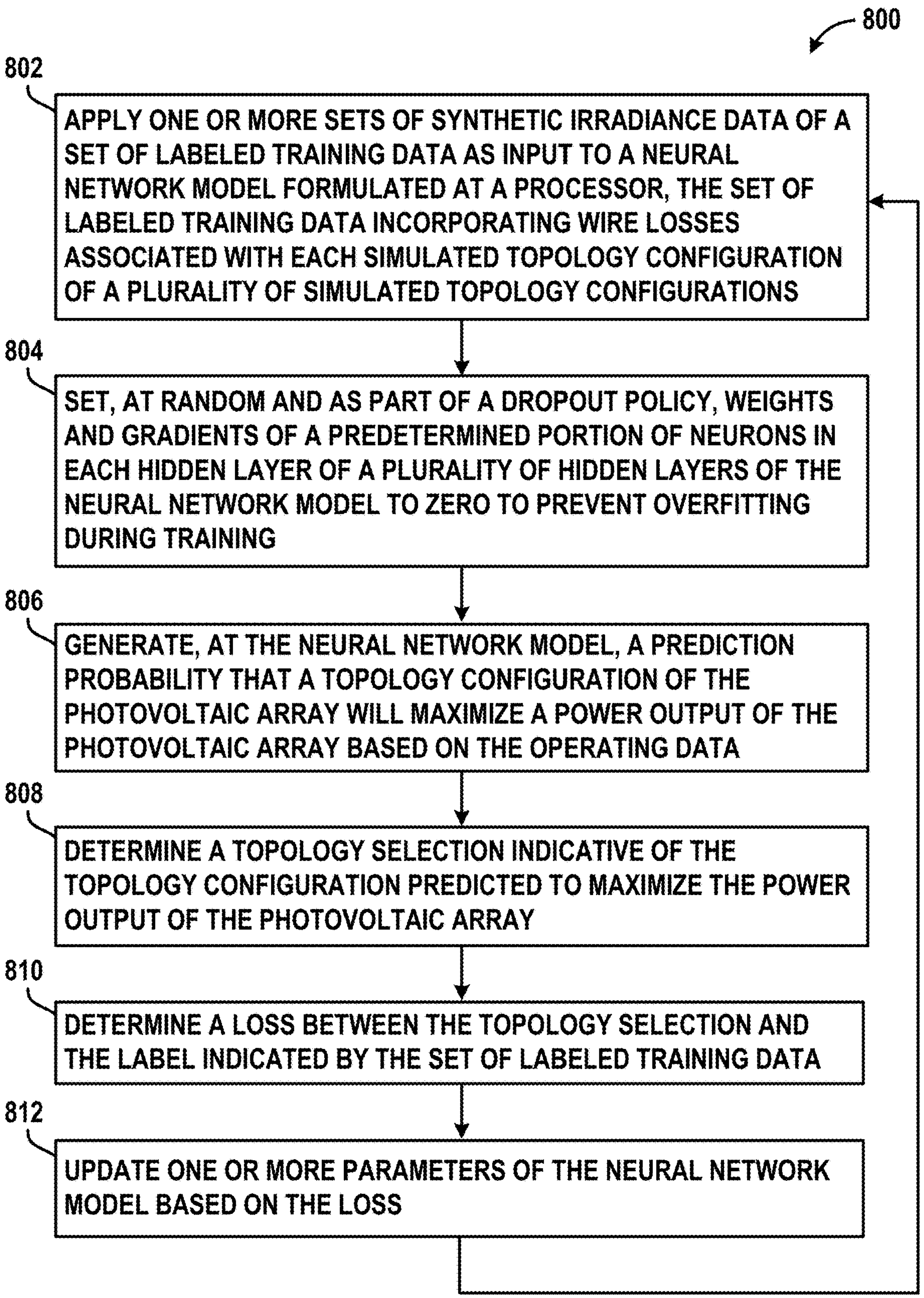
FIG. 8 is a process flow diagram showing a method for training the neural network model using labeled training data according to the simulation and training framework of FIG. 2C.

FIG. 8 is a process flow diagram showing a method 800 for training a neural network to perform photovoltaic topology reconfiguration according to the systems outlined herein. The method 800 can be part of the photovoltaic topology reconfiguration processes/services 590 shown in FIG. 5 implementing aspects of the training module 260 shown in FIG. 2C.

Step 802 of method 800 includes applying one or more sets of synthetic irradiance data of a set of labeled training data (e.g., after generating the set of labeled training data according to method 700 shown in FIG. 7) as input to a neural network model (e.g., neural network model 220 shown in FIGS. 2A-2C) formulated at a processor, the set of labeled training data incorporating wire losses associated with each simulated topology configuration of a plurality of simulated topology configurations. Step 804 of method 800 includes, setting, at random and as part of a dropout policy, weights and gradients of a predetermined portion of neurons in each hidden layer of a plurality of hidden layers of the neural network model to zero to prevent overfitting during training. Step 806 of method 800 includes generating, at the neural network model, a prediction probability that a topology configuration of the photovoltaic array will maximize a power output of the photovoltaic array based on the operating data. Step 808 of method 800 includes determining a topology selection indicative of the topology configuration predicted to maximize the power output of the photovoltaic array (e.g., similar to step 604 including sub-steps thereof and step 622 of method 600 shown in FIGS. 6A-6C, except with the labeled training data as input instead of actual operating data). Step 810 of method 800 includes determining a loss between the topology selection and the label indicated by the set of labeled training data. Step 812 of method 800 includes updating one or more parameters of the neural network model based on the loss. Method 800 can be iteratively applied as needed to train the neural network model.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for providing dynamic switching across different topologies, comprising:

a processor in communication with a memory, the memory including instructions executable by the processor to:

receive operating data as input to a neural network model formulated at the processor, the operating data including a set of irradiance values for a plurality of panels of a photovoltaic (PV) array;

generate, at the neural network model, a prediction probability that a topology configuration of a plurality of topology configurations that the photovoltaic array maximize a power output of the photovoltaic array based on the operating data, the neural network model incorporating a batchnorm operation at each hidden layer of a plurality of hidden layers of the neural network model, and the neural network model further incorporating a dropout policy during training of the neural network model for regularization of the neural network model;

access synthetic irradiance data of a set of labeled training data representing a shading condition;

apply the synthetic irradiance data as input to a PV array simulation model for one or more simulated topology configurations to obtain a set of simulated power output values, the PV array simulation model having a plurality of simulated panels connected by a plurality of simulated linkages and where each simulated linkage incorporates a wire loss, the wire loss being dependent upon a simulated topology configuration of the PV array simulation model; wherein the PV array simulation model including:

a first subset of the plurality of simulated linkages that couple two or more simulated panels of a first string of simulated panels in series, the wire loss for each simulated linkage of the first subset incorporating a first resistance value; and a second subset of the plurality of simulated linkages that couple the first string of simulated panels to an adjacent second string of simulated panels, the wire loss for each simulated linkage of the second subset incorporating a second resistance value that is two times greater than the first resistance value when activated;

determine a topology selection indicative of the topology configuration predicted to maximize the power output of the photovoltaic array;

communicate the determined topology selection to the photovoltaic array; and reconfigure one or more linkages of the photovoltaic array according to the determined the topology selection to maximize the power output of the photovoltaic array.

2. The system of claim 1, wherein the neural network model generates prediction probabilities for each topology configuration of the plurality of topology configurations, including:

a series-parallel configuration a bridge-link configuration;

a honeycomb configuration; and a total-cross-tied configuration.

3. The system of claim 1, the memory further including instructions executable by the processor to:

receive, at a first input layer of the neural network model, the operating data including the set of irradiance values for the plurality of panels of the photovoltaic array;

wherein the first input layer of the neural network model includes a plurality of input layer neurons, wherein a quantity of the plurality of input layer neurons corresponds with a quantity of panels of the photovoltaic array.

4. The system of claim 1, the memory further including instructions executable by the processor to:

receive, at a hidden layer of the plurality of hidden layers of the neural network model, an output of a previous layer of the neural network model; and apply, at the hidden layer of the plurality of hidden layers of the neural network model, an affine transformation followed by a non-linear activation function to the output of the previous layer.

5. The system of claim 1, the memory further including instructions executable by the processor to:

set, at random and as part of the dropout policy, weights and gradients of a predetermined portion of neurons in each hidden layer of the plurality of hidden layers to zero.

6. The system of claim 1, the memory further including instructions executable by the processor to:

receive, at an output layer of the neural network model, an output of a final hidden layer of the plurality of hidden layers of the neural network model; and apply, at the output layer of the neural network model, a softmax activation function to the output of the final hidden layer of the neural network model including the prediction probability that the topology configuration will maximize the power output of the photovoltaic array.

7. The system of claim 1, the memory further including instructions executable by the processor to:

apply the synthetic irradiance data as input to the neural network model;

generate, at the neural network model, a prediction probability that each respective simulated topology configuration produces of the one or more simulated topology configurations a maximum simulated power output based on the synthetic irradiance data;

determine a topology selection indicative of the simulated topology configuration associated with a highest prediction probability value;

determine a loss between the topology selection and the set of labeled training data; and update one or more parameters of the neural network model based on the loss.

8. The system of claim 7, the memory further including instructions executable by the processor to:

identify, based on the set of simulated power output values, a simulated topology configuration of the one or more simulated topology configurations that produces a maximum simulated power output value of the set of simulated power output values; and assign the simulated topology configuration that produces the maximum simulated power output value as a label associated with the synthetic irradiance data for inclusion within the set of labeled training data.

9. The system of claim 8, the memory further including instructions executable by the processor to:

deactivate simulated linkages of the second subset according to a series-parallel topology configuration.

10. The system of claim 8, the memory further including instructions executable by the processor to:

activate or deactivate simulated linkages of the second subset according to a bridge link topology configuration.

11. The system of claim 8, the memory further including instructions executable by the processor to:

activate or deactivate simulated linkages of the second subset according to a honeycomb topology configuration.

12. The system of claim 8, the memory further including instructions executable by the processor to:

activate simulated linkages of the second subset according to a total-cross-tied topology configuration.

13. A method for providing dynamic switching across different topologies, comprising:

receiving operating data as input to a neural network model formulated at a processor, the operating data including a set of irradiance values for a plurality of panels of a photovoltaic (PV) array;

generating, at the neural network model, a prediction probability that a topology configuration of a plurality of topology configurations that the photovoltaic array maximize a power output of the photovoltaic array based on the operating data, the neural network model incorporating a batchnorm at each hidden layer of a plurality of hidden layers of the neural network model, and the neural network model further incorporating a dropout policy during training of the neural network model for regularization of the neural network model;

accessing synthetic irradiance data of a set of labeled training data representing a shading condition;

applying the synthetic irradiance data as input to a PV array simulation model for one or more simulated topology configurations to obtain a set of simulated power output values, the PV array simulation model having a plurality of simulated panels connected by a plurality of simulated linkages and where each simulated linkage incorporates a wire loss, the wire loss being dependent upon a simulated topology configuration of the PV array simulation model, wherein the PV array simulation model includes:

a first subset of the plurality of simulated linkages that couple two or more simulated panels of a first string of simulated panels in series, the wire loss for each simulated linkage of the first subset incorporating a first resistance value; and a second subset of the plurality of simulated linkages that couple the first string of simulated panels to an adjacent second string of simulated panels, the wire loss for each simulated linkage of the second subset incorporating a second resistance value that is two times greater than the first resistance value when activated;

determining a topology selection indicative of the topology configuration predicted to maximize the power output of the photovoltaic array;

communicating the determined topology selection to the photovoltaic array; and reconfiguring one or more linkages of the photovoltaic array according to the determined topology selection to maximize the power output of the photovoltaic array.

14. The method of claim 13, further comprising:

generating, at the neural network, prediction probabilities for each topology configuration of a plurality of topology configurations, including:

a series-parallel configuration;

a bridge-link configuration;

a honeycomb configuration; and a total-cross-tied configuration.

15. The method of claim 13, further comprising:

receiving, at a first input layer of the neural network model, the operating data including the set of irradiance values for the plurality of panels of the photovoltaic array;

the first input layer of the neural network model including a plurality of input layer neurons, and a quantity of the plurality of input layer neurons corresponding with a quantity of panels of the photovoltaic array.

16. The method of claim 13, further comprising:

receiving, at a hidden layer of the plurality of hidden layers of the neural network model, an output of a previous layer of the neural network model; and applying, at the hidden layer of the plurality of hidden layers of the neural network model, an affine transformation followed by a non-linear activation function to the output of the previous layer.

17. The method of claim 13, further comprising:

setting, at random and as part of the dropout policy, weights and gradients of a predetermined portion of neurons in each hidden layer of the plurality of hidden layers to zero.

18. The method of claim 13, further comprising:

receiving, at an output layer of the neural network model, an output of a final hidden layer of the plurality of hidden layers of the neural network model; and applying, at the output layer of the neural network model, a softmax activation function to the output of the final hidden layer of the neural network model including the prediction probability that the topology configuration will maximize the power output of the photovoltaic array.

19. The method of claim 13, further comprising:

applying synthetic irradiance data as input to the neural network model;

generating, at the neural network model, a prediction probability that each respective simulated topology configuration produces of the one or more simulated topology configurations a maximum simulated power output based on the synthetic irradiance data;

determining a topology selection indicative of the simulated topology configuration associated with a highest prediction probability value;

determining a loss between the topology selection and the label indicated by the set of labeled training data; and updating one or more parameters of the neural network model based on the loss.

20. The method of claim 19, further comprising:

identify, based on the set of simulated power output values, a simulated topology configuration of the one or more simulated topology configurations that produces a maximum simulated power output value of the set of simulated power output values; and assign the simulated topology configuration that produces the maximum simulated power output value as a label associated with the synthetic irradiance data for inclusion within the set of labeled training data.

21. The method of claim 20, further comprising:

deactivating one or more simulated linkages according to a series-parallel topology configuration.

22. The method of claim 20, further comprising:

activating or deactivating one or more simulated linkages according to a bridge link topology configuration.

23. The method of claim 20, further comprising:

activating or deactivating one or more simulated linkages according to a honeycomb topology configuration.

24. The method of claim 20, further comprising:

activating one or more simulated linkages according to a total-cross-tied topology configuration.

* * * * *